US012031449B2

(12) United States Patent
Arai

(10) Patent No.: US 12,031,449 B2
(45) Date of Patent: Jul. 9, 2024

(54) ASSEMBLING STRUCTURE OF COMPRESSOR OF GAS TURBINE ENGINE

(71) Applicant: KAWASAKI JUKOGYO KABUSHIKI KAISHA, Kobe (JP)

(72) Inventor: Atsunori Arai, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 17/799,347

(22) PCT Filed: Feb. 18, 2021

(86) PCT No.: PCT/JP2021/006118
§ 371 (c)(1),
(2) Date: Aug. 12, 2022

(87) PCT Pub. No.: WO2021/167003
PCT Pub. Date: Aug. 26, 2021

(65) Prior Publication Data

US 2023/0340892 A1 Oct. 26, 2023

Related U.S. Application Data

(60) Provisional application No. 62/978,993, filed on Feb. 20, 2020.

(51) Int. Cl.
*F01D 25/24* (2006.01)
*F04D 29/52* (2006.01)

(52) U.S. Cl.
CPC ......... *F01D 25/243* (2013.01); *F01D 25/246* (2013.01); *F04D 29/526* (2013.01); *F05D 2260/31* (2013.01)

(58) Field of Classification Search
CPC ..... F01D 25/246; F01D 25/243; F04D 29/526
See application file for complete search history.

(56) References Cited

U.S. PATENT DOCUMENTS 2,766,963 A * 10/1956 Zimmerman ......... F01D 25/246 415/137
4,426,191 A * 1/1984 Brodell ................ F01D 25/246 415/199.5

(Continued)

FOREIGN PATENT DOCUMENTS

JP 2017-078404 A 4/2017

OTHER PUBLICATIONS

International Search Report for PCT/JP2021/006118 dated Apr. 6, 2021 [PCT/ISA/210].

*Primary Examiner* — Ted Kim
(74) *Attorney, Agent, or Firm* — Sughrue Mion, PLLC

(57) ABSTRACT

A stationary blade unit including a first engaging portion projecting from an outer tube toward a first side in an axial direction; and a second engaging portion projecting from the outer tube toward a second side in the axial direction. A first outer shell includes a first flange and a first engaged portion into which the first engaging portion is slidingly inserted in the axial direction. A second outer shell includes: a second flange fastened to the first flange by a fastener; and a second engaged portion into which the second engaging portion is slidingly inserted in the axial direction. The stationary blade unit includes a projection projecting outward in a radial direction from the outer tube. One of the first outer shell and the second outer shell includes an integrated stopper arranged on a rotation trajectory of the projection around an axis.

2 Claims, 3 Drawing Sheets

(56) References Cited

U.S. PATENT DOCUMENTS

| | | | | |
|---|---|---|---|---|
| 5,004,402 | A * | 4/1991 | Burchette | F01D 25/246 415/137 |
| 2004/0033133 | A1 * | 2/2004 | Muny | F01D 25/246 415/175 |
| 2005/0111969 | A1 * | 5/2005 | Arness | F01D 25/246 415/189 |
| 2005/0232759 | A1 | 10/2005 | Bailleul et al. | |
| 2007/0025837 | A1 * | 2/2007 | Pezzetti | F01D 25/246 415/115 |
| 2007/0183891 | A1 * | 8/2007 | Evans | F01D 25/246 415/208.1 |
| 2017/0081979 | A1 | 3/2017 | Fitzpatrick et al. | |
| 2018/0080477 | A1 | 3/2018 | Freeman | |
| 2020/0158022 | A1 * | 5/2020 | McCaffrey | F01D 25/24 |

* cited by examiner

ASSEMBLING STRUCTURE OF COMPRESSOR OF GAS TURBINE ENGINE

CROSS REFERENCE TO RELATED APPLICATIONS

This application is a National Stage of International Application No. PCT/JP2021/006118 filed Feb. 18, 2021, claiming priority based on U.S. Patent Application No. 62/978,993 filed Feb. 20, 2020, the entire contents of which are incorporated herein by reference.

TECHNICAL FIELD

The present disclosure relates to an assembling structure of a compressor of a gas turbine engine.

BACKGROUND ART

A gas turbine engine in which a compressor, a combustor, and a turbine are arranged along a rotating shaft has been known.

CITATION LIST

Patent Literature

PTL 1: Japanese Laid-Open Patent Application Publication No. 2017-78404

SUMMARY OF INVENTION

Technical Problem

In some cases, the gas turbine engine is required to be designed to be lightweight and compact. Especially, a space outside an engine outer shell is required to be as large as possible in order to mount accessories. A stationary blade of a conventional compressor supports, by flange fastening, a load acting in a rotational direction of the stationary blade by engine mainstream. However, the space outside the engine outer shell narrows as the flange fastening increases.

Solution to Problem

An assembling structure of a compressor of a gas turbine engine according to one aspect of the present disclosure is an assembling structure of a compressor of a gas turbine engine in which the compressor, a combustor, and a turbine are arranged along a rotating shaft. The assembling structure includes: a first outer shell including a first outer shell main body and a first flange that projects outward in a radial direction from the first outer shell main body; a second outer shell including a second outer shell main body and a second flange that projects outward in the radial direction from the second outer shell main body and is fastened to the first flange by a fastener, the second outer shell being assembled to the first outer shell in an axial direction; and a stationary blade unit including stationary blades and an outer tube to which radially outer ends of the stationary blades are connected, the stationary blade unit being arranged at a radially inner side of the first outer shell and the second outer shell and held by the first outer shell and the second outer shell. The stationary blade unit includes: a first engaging portion projecting from the outer tube toward a first side in the axial direction; and a second engaging portion projecting from the outer tube toward a second side in the axial direction. The first outer shell includes a first engaged portion into which the first engaging portion is slidingly inserted in the axial direction. The second outer shell includes a second engaged portion into which the second engaging portion is slidingly inserted in the axial direction. The stationary blade unit includes a projection projecting outward in the radial direction from the outer tube. One of the first outer shell and the second outer shell includes a stopper arranged on a rotation trajectory of the projection around an axis. The projection is integrated with the stationary blade unit. The stopper is integrated with the one of the first outer shell and the second outer shell.

According to the above configuration, the stationary blade unit can be positioned in the axial direction and the radial direction in such a simple manner that the first engaging portion and the second engaging portion of the stationary blade unit are respectively and slidingly inserted into the first engaged portion of the first outer shell and the second engaged portion of the second outer shell and are fastened by the flanges. Moreover, since the projection of the stationary blade unit interferes with the stopper of the outer shell, the stationary blade unit can be positioned in a rotational direction around the axis. Then, since the projection is integrated with the outer tube, and the stopper is integrated with the outer shell, the number of parts is reduced, and the space saving is realized. In addition, the seal performance improves.

Advantageous Effects of Invention

According to the present disclosure, the positioning is facilitated. Moreover, the number of parts is reduced, and the space saving is realized. Furthermore, the seal performance improves.

DESCRIPTION OF EMBODIMENTS

Hereinafter, an embodiment will be described with reference to the drawings.

Figure 1:
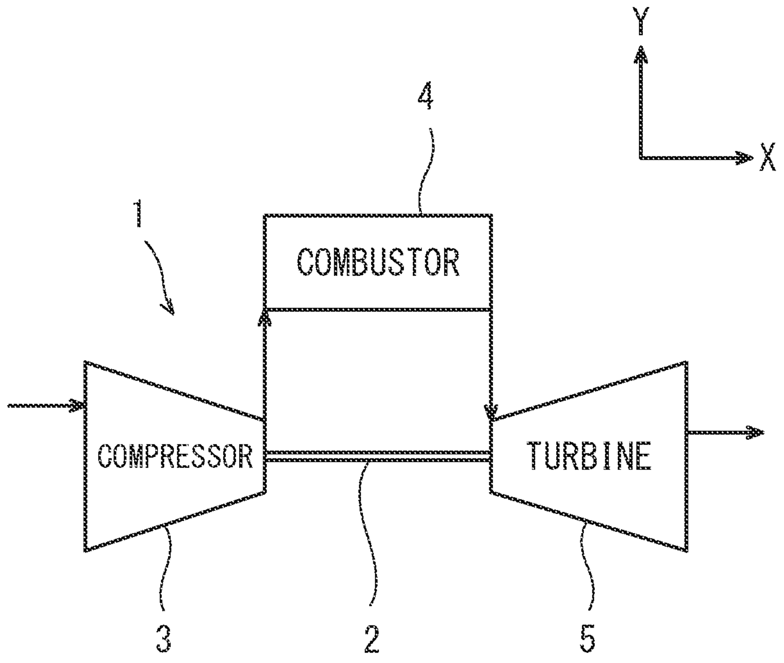
FIG. 1 is a schematic diagram of a gas turbine engine according to an embodiment.

FIG. 1 is a schematic diagram of a gas turbine engine 1 according to the embodiment. As shown in FIG. 1, the gas turbine engine 1 includes a compressor 3, a combustor 4, and a turbine 5 which are arranged along a rotating shaft 2. Air compressed by the compressor 3 is combusted by the combustor 4, and its combustion gas rotates the turbine 5. Thus, the rotating shaft 2 is driven. A direction in which an axis of the rotating shaft 2 extends is referred to as an axial direction X. A direction orthogonal to the axial direction X is referred to as a radial direction Y A direction around the rotating shaft 2 is referred to as a circumferential direction Z.

Figure 2:
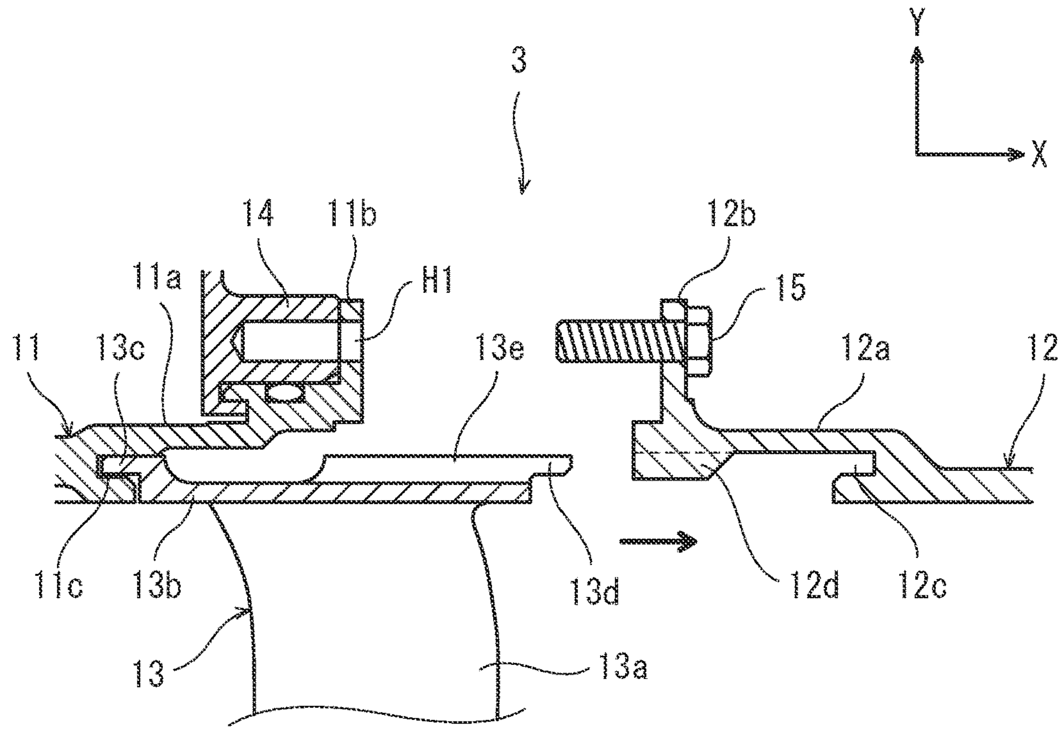
FIG. 2 is a sectional view showing that an assembling structure of the gas turbine engine of FIG. 1 is not assembled yet.
Figure 3:
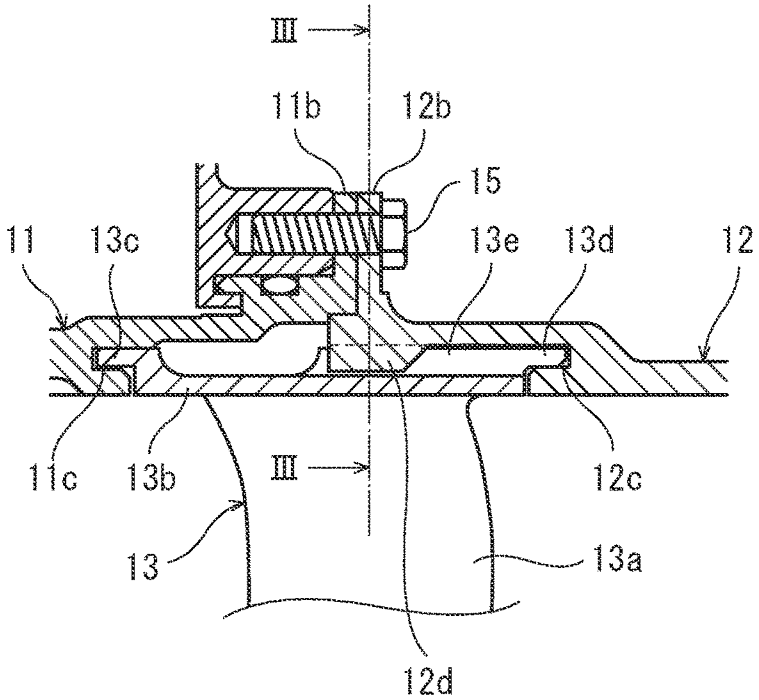
FIG. 3 is a sectional view showing that the assembling structure of FIG. 2 has been assembled.
Figure 4:
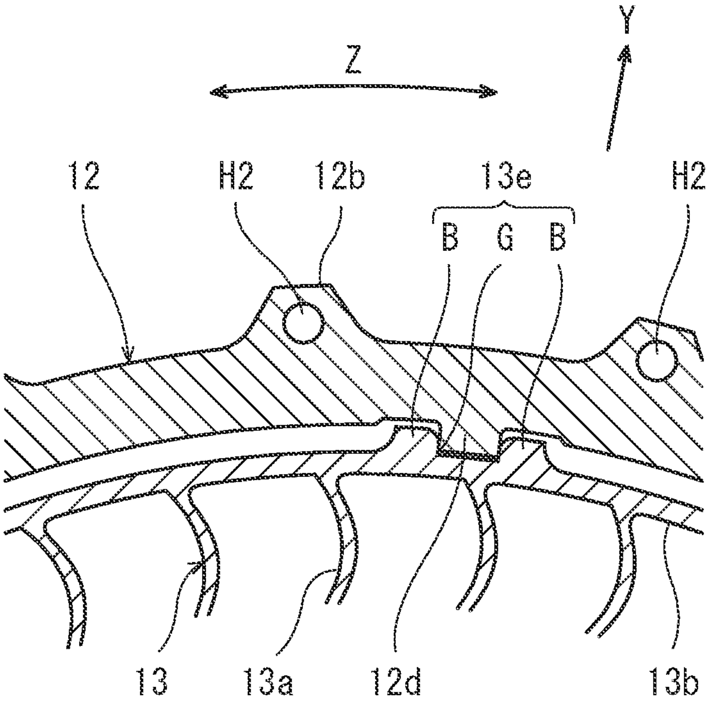
FIG. 4 is a sectional view taken along line III-III of FIG. 3.

FIG. 2 is a sectional view showing that an assembling structure of the gas turbine engine 1 according to the embodiment is not assembled yet. FIG. 3 is a sectional view showing that the assembling structure of FIG. 2 has been assembled. FIG. 4 is a sectional view taken along line III-III of FIG. 3. As shown in FIGS. 2 to 4, the compressor 3 includes a first outer shell 11, a second outer shell 12, and a stationary blade unit 13. The first outer shell 11, the second outer shell 12, and the stationary blade unit 13 are separate members. The first outer shell 11, the second outer shell 12, and the stationary blade unit 13 are assembled to each other and coupled to each other by a bolt 15 and a nut 14.

The first outer shell 11 includes a first outer shell main body 11*a*, a first flange 11*b*, and a first engaged portion 11*c*. The first outer shell main body 11*a* has a tubular shape. The first flange 11*b* projects outward in the radial direction Y from an end portion of the first outer shell main body 11*a* which portion is located close to the second outer shell 12 in the axial direction X. The first flange 11*b* extends in an annular shape along an entire outer circumference of the first outer shell main body 11*a*. The nut 14 is disposed at a back surface side of the first flange 11*b* (i.e., at an opposite side of the second outer shell 12 in the axial direction X). The first flange 11*b* includes a bolt hole H1 communicating with the nut 14.

The first engaged portion 11*c* is located at an inner peripheral surface side of the first outer shell main body 11*a*. The first engaged portion 11*c* is an annular recess that extends in the circumferential direction Z of the first outer shell main body 11*a* and is open toward the second outer shell 12 in the axial direction X. The first engaged portion 11*c* is located at a position that is farther from the second outer shell 12 than the first flange 11*b* in the axial direction X.

The second outer shell 12 includes a second outer shell main body 12*a*, a second flange 12*b*, a second engaged portion 12*c*, and a stopper 12*d*. The second outer shell main body 12*a* has a tubular shape. The second flange 12*b* projects outward in the radial direction Y from an end portion of the second outer shell main body 12*a* which portion is located close to the first outer shell 11 in the axial direction X. The second flange 12*b* extends in an annular shape along an entire outer circumference of the second outer shell main body 12*a*. The second flange 12*b* includes a bolt hole H2 that coincides with the bolt hole H1 of the first flange 11*b*.

The second engaged portion 12*c* is located at an inner peripheral surface side of the second outer shell main body 12*a*. The second engaged portion 12*c* is an annular recess that extends in the circumferential direction Z of the second outer shell main body 12*a* and is open toward the first outer shell 11 in the axial direction X. The second engaged portion 12*c* is located at a position that is farther from the first outer shell 11 than the second flange 12*b* in the axial direction X. The stopper 12*d* partially projects inward in the radial direction Y from the inner peripheral surface of the second outer shell main body 12*a*. The stopper 12*d* and the second flange 12*b* are arranged so as to be lined up in the circumferential direction Z. When viewed in the radial direction, the stopper 12*d* overlaps the second flange 12*b*. The stopper 12*d* is integrated with the second outer shell 12.

The stationary blade unit 13 includes stationary blades 13*a*, an outer tube 13*b*, a first engaging portion 13*c*, a second engaging portion 13*d*, and a projection 13*e*. The stationary blades 13*a* are arranged at intervals in the circumferential direction Z around the rotating shaft 2 (see FIG. 1). Outer ends of the stationary blades 13*a* in the radial direction Y are connected to an inner peripheral surface of the outer tube 13*b*. The first engaging portion 13*c* projects from the outer tube 13*b* toward the first outer shell 11 in the axial direction X. The second engaging portion 13*d* projects from the outer tube 13*b* toward the second outer shell 12 in the axial direction X. The first engaging portion 13*c* and the second engaging portion 13*d* are arranged outside the outer tube 13*b* in the radial direction.

The projection 13*e* is partially located on an outer peripheral surface of the outer tube 13*b*. The projection 13*e* is integrated with the stationary blade unit 13. The projection 13*e* includes a groove portion G and a pair of bulge portions B. The groove portion G extends in the axial direction X and is open outward in the radial direction Y. The pair of bulge portions B are located at both sides of the groove portion G in the circumferential direction Z of the outer tube 13*b*. The groove portion G is open toward the second outer shell 12 in the axial direction X. The bulge portions B are formed in such a manner that the outer peripheral surface of the outer tube 13*b* partially projects outward in the radial direction Y. The second engaging portion 13*d* projects from the bulge portions B toward the second outer shell 12 in the axial direction X.

Next, a procedure of assembling the first outer shell 11, the second outer shell 12, and the stationary blade unit 13 will be described. The first engaging portion 13*c* of the stationary blade unit 13 is slidingly inserted into the first engaged portion 11*c* of the first outer shell 11 in the axial direction X. The stopper 12*d* of the second outer shell 12 is slidingly inserted into the groove portion G of the projection 13*e* of the stationary blade unit 13, and the second engaging portion 13*d* of the stationary blade unit 13 is slidingly inserted into the second engaged portion 12*c* of the second outer shell 12 in the axial direction X. In this state, the first flange 11*b* of the first outer shell 11 and the second flange 12*b* of the second outer shell 12 are in surface-contact with each other, and the bolt 15 is inserted into the bolt hole H1 of the first flange 11 and the bolt hole H2 of the second flange 12 and is fastened to the nut 14.

Thus, the first outer shell 11 and the second outer shell 12 are assembled to each other in the axial direction X, and the stationary blade unit 13 is arranged at a radially inner side of the first outer shell 11 and the second outer shell 12 and is held by the first outer shell 11 and the second outer shell 12. To be specific, the first outer shell 11, the second outer shell 12, and the stationary blade unit 13 are assembled to each other to constitute the assembling structure. In this assembling structure, the projection 13*e* is arranged on a rotation trajectory of the stopper 12*d* around an axis X.

To be specific, the projection 13*e* is arranged at both sides of the stopper 12*d* in the circumferential direction Z. Specifically, the stopper 12*d* is opposed in the circumferential direction Z to and is in surface-contact with both side surfaces (in other words, the bulge portions B) of the groove portion G of the projection 13*e*. With this, the rotation of the stationary blade unit 13 relative to the first outer shell 11 and the second outer shell 12 is prevented. At least one rotation preventing structure described as above is disposed in the circumferential direction Z. Preferably, plural rotation preventing structures are disposed.

According to the above-described configuration, only by assembling the first outer shell 11 to the second outer shell 12 in the axial direction X, the stationary blade unit 13 is slidingly inserted into the first outer shell 11 and the second outer shell 12. Thus, the stationary blade unit 13 is positioned in the axial direction X and the radial direction Y and is also positioned in a rotational direction (circumferential direction Z) by the stopper 12*d* and the projection 13*e*. Since an additional flange that prevents the rotation of the stationary blade unit 13 is unnecessary, the size reduction and the weight reduction can be realized.

Moreover, since the projection 13*e* is integrated with the outer tube 13*b*, and the stopper 12*d* is integrated with the second outer shell main body 12*a*, the seal performance improves. Furthermore, since the stopper 12*d* and the second flange 12*b* are arranged so as to be lined up in the circumferential direction Z, the rigidity of the rotation preventing structure improves. Since the stopper 12*d* overlaps the second flange 12*b* when viewed in the radial direction Y, the rigidity of the rotation preventing structure improves.

The present disclosure is not limited to the above embodiment, and modifications, additions, and eliminations may be made with respect to the configuration of the embodiment. The stopper 12*d* may be located at the first outer shell main body 11*a* of the first outer shell 11. The stopper 12*d* may be located on the outer peripheral surface of the stationary blade unit 13, and the projection 13*e* may be located on the inner peripheral surface of the second outer shell 12 (or the first outer shell 11). The projection 13*e* may be a portion that does not include the bulge portions B but includes the groove portion G.

The invention claimed is:

1. An assembling structure of a compressor of a gas turbine engine in which the compressor, a combustor, and a turbine are arranged along a rotating shaft, the assembling structure comprising:

a first outer shell including a first outer shell main body and a first flange that projects outward in a radial direction from the first outer shell main body;

a second outer shell including a second outer shell main body and a second flange that projects outward in the radial direction from the second outer shell main body and is fastened to the first flange by a fastener, the second outer shell being assembled to the first outer shell in an axial direction; and a stationary blade unit including stationary blades and an outer tube to which radially outer ends of the stationary blades are connected, the stationary blade unit being arranged at a radially inner side of the first outer shell and the second outer shell and held by the first outer shell and the second outer shell, wherein:

the stationary blade unit includes a first engaging portion projecting from the outer tube toward a first side in the axial direction and a second engaging portion projecting from the outer tube toward a second side in the axial direction;

the first outer shell includes a first engaged portion into which the first engaging portion is slidingly inserted in the axial direction;

the second outer shell includes a second engaged portion into which the second engaging portion is slidingly inserted in the axial direction;

the stationary blade unit includes a projection projecting outward in the radial direction from the outer tube;

the second outer shell includes a stopper arranged on a rotation trajectory of the projection around an axis;

the projection is integrated with the stationary blade unit;

the stopper is integrated with the second outer shell; and the stopper overlaps the second flange when viewed in the radial direction, wherein a position of the protrusion in the axial direction overlaps an outermost position of the static blade in the axial direction.

2. An assembling structure of a compressor of a gas turbine engine in which the compressor, a combustor, and a turbine are arranged along a rotating shaft, the assembling structure comprising:

a first outer shell including a first outer shell main body and a first flange that projects outward in a radial direction from the first outer shell main body;

a second outer shell including a second outer shell main body and a second flange that projects outward in the radial direction from the second outer shell main body and is fastened to the first flange by a fastener, the second outer shell being assembled to the first outer shell in an axial direction; and a stationary blade unit including stationary blades and an outer tube to which radially outer ends of the stationary blades are connected, the stationary blade unit being arranged at a radially inner side of the first outer shell and the second outer shell and held by the first outer shell and the second outer shell, wherein:

the stationary blade unit includes a first engaging portion projecting from the outer tube toward a first side in the axial direction and a second engaging portion projecting from the outer tube toward a second side in the axial direction;

the first outer shell includes a first engaged portion into which the first engaging portion is slidingly inserted in the axial direction;

the second outer shell includes a second engaged portion into which the second engaging portion is slidingly inserted in the axial direction;

the stationary blade unit includes a projection projecting outward in the radial direction from the outer tube;

the second outer shell includes a stopper arranged on a rotation trajectory of the projection around an axis;

the projection is integrated with the stationary blade unit;

the stopper is integrated with the second outer shell; and a position of the protrusion in the axial direction overlaps an outermost position of the static blade in the axial direction.

* * * * *